United States Patent [19]

Kuo

[11] Patent Number: 4,680,455

[45] Date of Patent: Jul. 14, 1987

[54] METHOD OF MANIPULATING A CALCULATION AND DEVICE USED THEREWITH

[75] Inventor: Calven Kuo, Taipei, Taiwan

[73] Assignee: Aurora Mechatronecs Corp., Taipei, Taiwan

[21] Appl. No.: 846,178

[22] Filed: Mar. 31, 1986

[51] Int. Cl.[4] .................................................. G06C 7/02
[52] U.S. Cl. ..................................... 235/146; 235/1 D
[58] Field of Search .......... 235/1 R, 1 D, 146, 145 R; 84/471 R, 473, 481

[56] References Cited

U.S. PATENT DOCUMENTS 4,095,274 6/1978 Gordon .......................... 235/1 D X
4,113,980 9/1978 Bell .................................. 235/146 X
4,119,839 10/1978 Beckmann et al. ............. 235/146 X
4,320,838 3/1982 Braver ............................ 235/1 D X Primary Examiner—Benjamin R. Fuller
Attorney, Agent, or Firm—Sughrue, Mion, Zinn, Macpeak and Seas

[57] ABSTRACT

A method of manipulating a calculator comprises steps of selecting a desired instruction card, associating/attaching the instruction card to the calculator, and manipulating the special function keys according to the instructions. A set of auxiliary cards, having manipulation instructions, formula/equations, and manipulation principles printed thereon, can be attached to the calculator for achieving the method of manipulation.

9 Claims, 7 Drawing Figures

METHOD OF MANIPULATING A CALCULATION AND DEVICE USED THEREWITH

BACKGROUND OF THE INVENTION

The present invention relates to a method of manipulating a calculator and an auxiliary device used therewith.

Among various kinds of calculators, there is one commonly used by engineers and students studying science and engineering. The calculator is well known as "scientific calculator" which is characterized in having a set of special function keys such as sin, $sin^{-1}$, cos, $cos^{-1}$, tan, $tan^{-1}$, log, $e^{xx}$, $Y^x$, $\sqrt[x]{Y}$, etc. Of course, the scientific calculator includes numeral keys 0, 1, 2, 3, ... and ordinary functional keys $+$, $-$, $\times$, $\div$, $=$, ... etc. For example, an electric engineer often uses trig function keys, inverse trig function keys, square key $x^2$ and square root key $\sqrt{x}$ for calculating impedance and inductance.

While using the scientific calculator, users always have to make reference to the instruction manual which is prepared by the calculator manufacture to accompany the calculator for determining a suitable process to manipulate the keys, particularly the special function keys. Besides, if a certain calculation will be carried out in accordance with a formula/equation, the user always have to check into a textbook to find out that formula/equation. Usually, one can not remember all the formula/equation for various calculation, thus causing a serious difficulty and waste of time in searching for a suitable formula/equation.

SUMMARY OF THE INVENTION

It is therefore the main object of the present invention to provide a new method of manipulating the calculator with the help of a set of auxiliary devices for users to very quickly get the correct result.

The main feature of the method of manipulating a calculator is to determine/locate the suitable one among the auxiliary devices and then to associate the latter to the calculator forming a manipulation mode of the calculator.

Another feature of the present invention is to associate the selected auxiliary device onto the special function keys portion which is manufactured by a membrane key.

The auxiliary device is a set of instruction cards each having formulas and/or equations printed thereon together with a description of the principles involved and instructions on how to manipulate the keys. The instruction cards may be made of flexible sheet material showing those positions of those keys to be pushed. Alteratively, the instruction cards may also be made of firm sheet material having punched openings corresponding to those positions of keys to be pushed.

Accordingly, the method of manipulating a calculator according to this invention comprises steps of selecting a desired instruction card, associating the card with the calculator and manipulating keys according to the instruction on the instruction card. Each one of the set of instruction cards may be flexible with manipulating instruction, description of the principle and formula/equation printed thereon and also may be firm with punched openings at those positions that keys being pushed.

BRIEF DESCRIPTION OF THE DRAWINGS

Those and other objects, features and advantages will become apparent from the following detailed description of the preferred embodiments with reference to the accompanying drawings, wherein.

DETAILED DESCRIPTION OF THE PREFERRED EMBODIMENT

Figure 2:
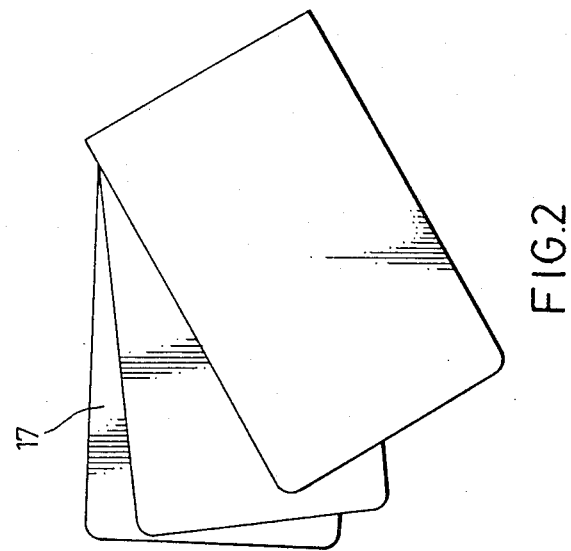
FIG. 2 is a perspective view of a set of auxiliary cards used as the auxiliary device for the method according to the present invention.
Figure 1:
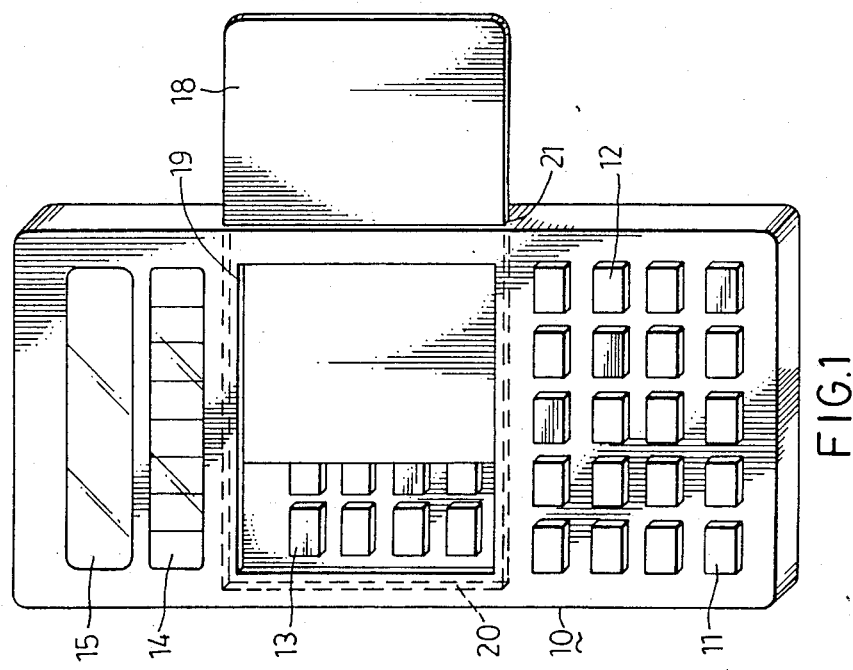
FIG. 1 is a perspective view of a calculator with an auxiliary card associated therewith for achieving the method of manipulating the calculator according to the present invention.

Referring to FIGS. 1 and 2, the scientific calculator 10 includes a set of numeral keys 11, a set of ordinary function keys 12, and a set of special function keys 13. The calculator 10 is also equiped with a photo cell 14, a display 15 and the necessary circuit built in the casing thereof. Since the structure and function of the scientific calculator is well known in the art, it will not be detailed here.

For matching the scientific calculator 10, there is a set of auxiliary devices 17 shown in FIG. 2 particularly in the shape of cards 17 each having instructions of manipulation printed thereon. The embodiments of the cards 17 will be described in more detail below with reference to FIGS. 6 and 7. Still referring to FIG. 1, the scientific calculator 10 includes a frame 19 surrounding the set of special function keys 13. There is formed a slot 20 along each side of the frame 19 and an opening 21 on one side thereof for the insertion of an auxiliary card 18. The card 18 is sleeved into the frame 19 and covers the special function keys 13.

Figure 3:
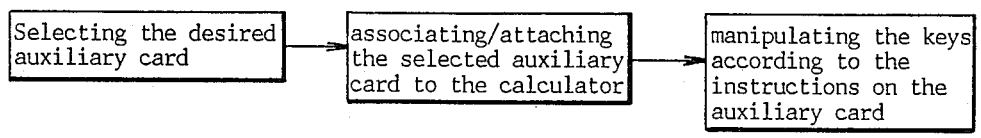
FIG. 3 is a block diagram showing the method of manipulating a claculator according to the present invention.

Referring to FIG. 3, the method of manipulating a calculator according to the present invention consists of substantially three steps. The first step is to select a desired/suitable card from a set of auxiliary cards. For example as shown in FIGS. 1 and 2, the desired card 18 is selected and picked out from a set of cards 17. The second step is to attach/associate the selected card to the calculator. The way of association in the embodiment of FIG. 1 is to insert the card 18 into the frame 19 of the calculator 10 and to cover the special function keys 13 with the card 18. The third step is to manipulate the keys according to the instructions shown on the card 18. This step will be more detailed hereinbelow.

There are several possible ways to achieve the second step of the method according to the present invention. The first way is best shown in FIG. 1, i.e. the association of the card 18 to the calculator is to insert the card into a frame structure 19 of the calculator. In this embodiment, the card 18 may be made of flexible sheet material with manipulating instructions printed thereon.

Figure 4:
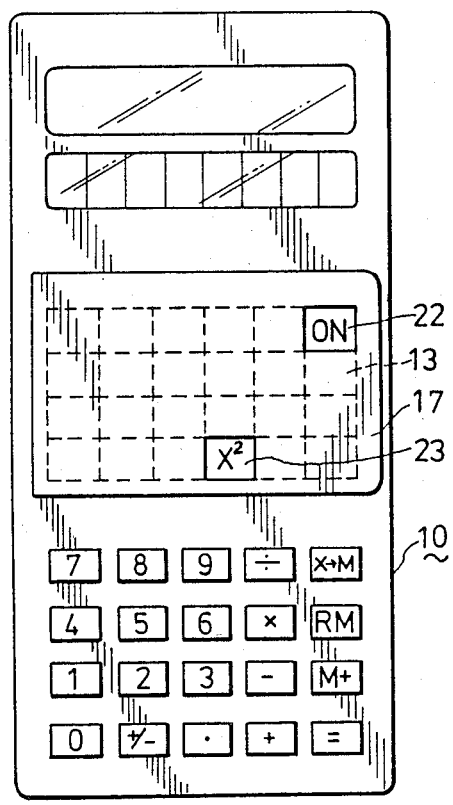
FIG. 4 is an illustrative view of a calculator and an auxiliary card showing an embodiment of associating the card to the calculator according to the method of the present invention.

Another possible way also the simpliest way to associate the card to the calculator is shown in FIG. 4. The special function keys 13 are made of a membrane key, therefore the card 17 may be directly put on the membrane. In this instance, the card 17 may still be made of flexible sheet material. But alternatively, the card 17 may be made of firm sheet material having openings 22, 23 formed thereon. It is seen that the opening 22 coincides the position of the switch key ON, and opening 23 coincides the position of the square key $x^2$. Because the card is relatively firm, therefore only those keys corresponding to the openings may be manipulated. Thus serves an advantage of avoiding miss manipulation of undesired keys.

Figure 5:
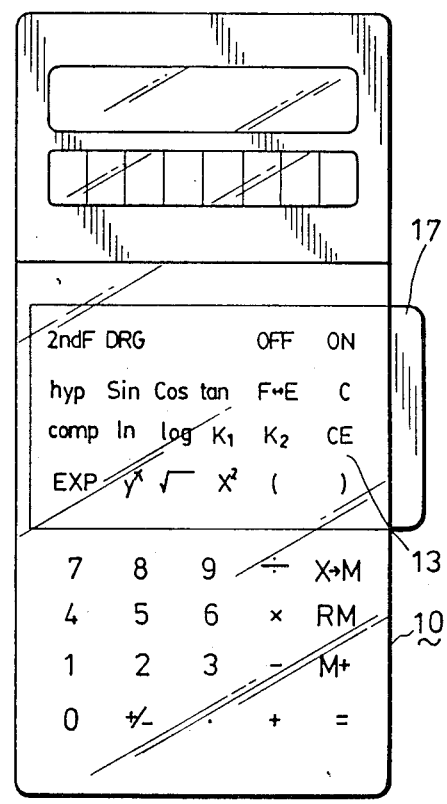
FIG. 5 is an illustrative view of a calculator having transparent film circuit and an auxiliary card showing a second embodiment of associating the card to the calculator according to the method of the present invention.

Still another possible way to associate the card to the calculator is shown in FIG. 5. In this embodiment, the calculator 10 includes a transparent layout of all the keys or at least the special function keys 13. The keys are made of film circuit which is a mylar film coated/-printed with the circuitry. The film circuit may be flexible one having two printed mylar films attached together, and may also be a rigid one having the printed film attached to a piece of glass. It is well known in the art that the former one is referred to as Film to Film circuit and the latter one is referred to as Film to Glass circuit. Since the special function keys 13 are made of transparent film circuit, the card 17 may be placed beneath the keys 13. One can still very easily to manipulate the keys by viewing through the film circuit key layout according to the instructions on the card 17.

Figure 6:
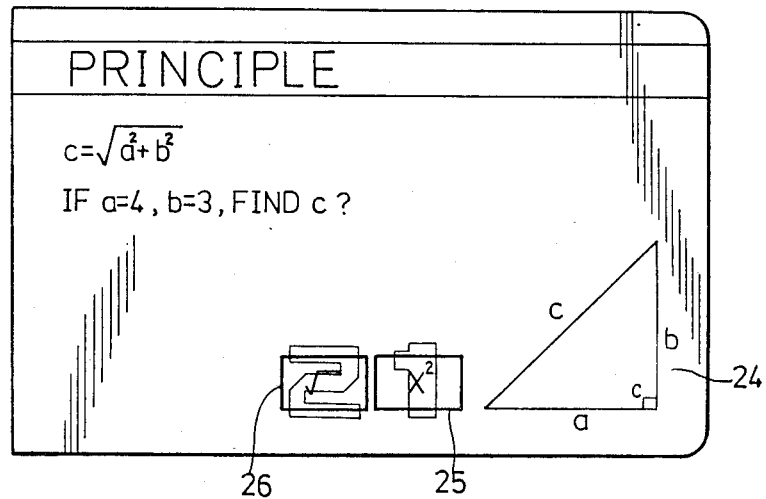
FIG. 6 is a front elevation of an embodiment of the auxiliary card according to the present invention.

The third step of the method of manipulating the calculator is described with reference to the example by using the auxiliary card shown in FIG. 6. The auxiliary card 24 has openings 25 and 26 corresponding to square key "$x^2$" and square root key "$\sqrt{}$" respectively. Thus card 24 is one for calculating the length of the inclined side of a normal triangle. It is indicated on the card an equation $c=\sqrt{a^2+b^2}$ and also an instruction that keys to be used are keys "x" and "$\sqrt{}$".

Therefore for example: $a=4$, $b=3$ find $c=?$
The sequence of manipulation of keys and result displayed will be as follows:

| Sequence | Key pushed | display |
|----------|------------|---------|
| 1 | "3" | 3 |
| 2 | "X" | 9 |
| 3 | "+" | 9 |
| 4 | "4" | 4 |
| 5 | "X" | 16 |
| 6 | "=" | 25 |
| 7 | "$\sqrt{}$" | 5 |

With the help of the auxiliary card 24 and by using the method of the present invention, the resulting length c is very easily and quickly obtained.

Figure 7:
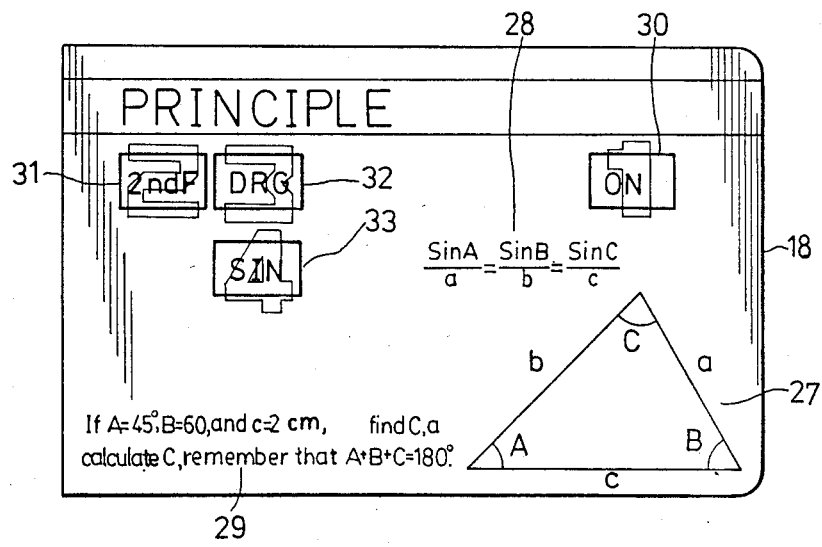
FIG. 7 is a front elevation of a second embodiment of the auxiliary card according to the present invention.

Another example will be illustrated with reference to the auxiliary card 18 shown in detail in FIG. 7. This card 18 is used for calculating the length of sides or degrees of angle of a triangle best shown as the FIG. 27. An equation (sin A/a)=(sin B/b)=(sin C/c) referred to as numeral 28 and other remarks 29 such as "remember $A+B+C=180°$" are also shown on the card. For this particular calculation, the keys to be manipulated among the special function keys are labbeled with numerals 1, 2, 3, 4. Therefore, the sequence of manipulation will be first to push key 31 "2ndF" for second special function to be effected, thirdly to push key 32 "DRG" for calculating in the degree mode and fourthly in the necessary occasion to push key 33 "sin" or "sin$^{-1}$" for obtaining the sine value of the angle.

Therefore, for example: $A=45°$ $B=60°$ $C=2^{cm}$ find $a=?$

From the remarks 29, we can obtain that angle C equals 75°. And again according to the equation 28, length of side "a" will be $a=c\times\sin A \div \sin C$.

The sequence of manipulatin of keys and result displayed will be as follows: t,0090

Therefore, with the help of the auxiliary card 18 and by using the method of the present invention, the length $a=1.464101$ cm is very easily obtained.

It will be understood that the instructions on each auxiliary card differs with one another for the purpose of various calculation purpose. And the calculator manufacture may provide a set of such auxiliary cards for the keys for their future ready use. With this concept, the scientific calculator will be more popular, useful and educational.

While the present invention has been particularly shown and described with reference to preferred embodiments thereof, it will be understood by those skilled in the art that various changes in form and details may be made therein without departing from the spirit and scope of the present invention as defined in the appended claims.

We claim:

1. A method of manipulating a calculator having a first face portion provided with numeral keys (11) and ordinary function keys (12) and a second face portion provided with special function keys (13), comprising the ordered steps of: selecting a desired auxiliary card from a set of such cards, said selected card having selected special function key manipulation instructions provided thereon; operatively superimposing said selected auxiliary card with the special function keys of the calculator; and manipulating the selected special function keys in accordance with the instructions on the selected auxiliary card.

2. A method of manipulating a calculator according to claim 1 wherein said selected auxiliary card is directly placed over the special function keys of the calculator.

3. A method of manipulating a calculator according to claim 1 wherein said selected auxiliary card is inserted into the calculator.

4. A method of manipulating a calculator according to claim 1 wherein said selected auxiliary card is underlayed beneath the special function keys of the calculator.

5. A combination calculator and manipulation device, comprising:
   a calculator body including numeral keys (11), ordinary function keys (12) and special function keys (13) provided thereon;
   a set of auxiliary cards (17), each having different selected special function key manipulation instructions provided thereon; and
   means for operatively superimposing a selected one of said auxiliary cards with said special function keys on said calculator body.

6. A combination calculator and manipulation device according to claim 5 wherein said auxiliary cards are made of firm sheet material.

7. A combination calculator and manipulation device according to claim 6 wherein said auxiliary cards include punched openings formed therein corresponding to positions of special function keys to be pushed.

8. A combination calculator and manipulation device according to claim 5 wherein said special function keys are membrane keys and said auxiliary cards are made of flexible sheet material.

9. A combination calculator and manipulation device according to claim 5 wherein said superimposing means comprises a frame (19) surrounding said special function keys having slots (20) formed in edges of the frame and an opening (21) for the insertion of a selected auxiliary card.

* * * * *